(12) United States Patent
Joo et al.

(10) Patent No.: US 10,914,217 B2
(45) Date of Patent: Feb. 9, 2021

(54) AMMONIA PRODUCTION CATALYST AND AFTER TREATMENT SYSTEM

(71) Applicant: Hyundai Motor Company, Seoul (KR)

(72) Inventors: Nahm Roh Joo, Gyeonggi-do (KR); Chang Hwan Kim, Gyeonggi-do (KR); ChangHo Jung, Gyeonggi-do (KR)

(73) Assignees: Hyundai Motor Company, Seoul (KR); KIA Motors Corporation, Seoul (KR)

(*) Notice: Subject to any disclaimer, the term of this patent is extended or adjusted under 35 U.S.C. 154(b) by 0 days.

(21) Appl. No.: 16/263,508

(22) Filed: Jan. 31, 2019

(65) Prior Publication Data
US 2020/0248606 A1 Aug. 6, 2020

(51) Int. Cl.
*F01N 3/20* (2006.01)
*B01D 53/94* (2006.01)
*B01J 23/44* (2006.01)
*F01N 3/10* (2006.01)
*F01N 13/00* (2010.01)
*F01N 3/08* (2006.01)

(52) U.S. Cl.
CPC ........... *F01N 3/2073* (2013.01); *B01D 53/94* (2013.01); *B01J 23/44* (2013.01); *F01N 3/0814* (2013.01); *F01N 3/0842* (2013.01); *F01N 3/101* (2013.01); *F01N 13/009* (2014.06); *F01N 2240/25* (2013.01); *F01N 2370/02* (2013.01)

(58) Field of Classification Search
None
See application file for complete search history.

(56) References Cited

U.S. PATENT DOCUMENTS

| | | | |
|---|---|---|---|
| 2009/0062117 A1* | 3/2009 | Kluge | B01D 53/9422 502/304 |
| 2010/0043402 A1 | 2/2010 | Perry et al. | |
| 2010/0139248 A1 | 6/2010 | Najt et al. | |
| 2010/0212295 A1 | 8/2010 | Narayanaswamy et al. | |
| 2010/0326052 A1 | 12/2010 | Sun | |
| 2011/0202253 A1 | 8/2011 | Perry et al. | |
| 2011/0288750 A1 | 11/2011 | Wermuth et al. | |
| 2012/0060472 A1 | 3/2012 | Li et al. | |
| 2015/0298061 A1* | 10/2015 | Irisawa | F01N 3/0842 422/169 |
| 2018/0045097 A1* | 2/2018 | Tang | B01J 35/0006 |
| 2018/0065112 A1* | 3/2018 | Schoneborn | B01D 53/9422 |

* cited by examiner

*Primary Examiner* — Jelitza M Perez
(74) *Attorney, Agent, or Firm* — Brinks Gilson & Lione

(57) ABSTRACT

An after treatment system is disclosed. The after treatment system may include an exhaust pipe through which an exhaust gas flows; a three-way catalyst (TWC) mounted on the exhaust pipe and purifying HC, CO, and NOx contained in the exhaust gas, an ammonia production catalyst (APC) mounted on the exhaust pipe at a downstream of the TWC, storing NOx at a lean air/fuel ratio, and generating $H_2$, releasing the stored NOx, and generating $NH_3$ using the released NOx and the generated $H_2$ at a rich air/fuel ratio, and a selective catalytic reduction (SCR) catalyst mounted on the exhaust pipe at a downstream of the APC, storing the $NH_3$ generated in the TWC and the APC, and reducing the NOx contained in the exhaust gas using the stored $NH_3$.

12 Claims, 6 Drawing Sheets

AMMONIA PRODUCTION CATALYST AND AFTER TREATMENT SYSTEM

FIELD

The present disclosure relates to an ammonia production catalyst (APC) and an after treatment system.

BACKGROUND

The statements in this section merely provide background information related to the present disclosure and may not constitute prior art.

Vehicles may be provided with at least one catalytic converter for reducing emission (EM) contained in an exhaust gas. The exhaust gas flowing out from an engine through an exhaust manifold is driven into a catalytic converter mounted at an exhaust pipe and is purified therein. After that, noise of the exhaust gas is decreased while passing through a muffler and then the exhaust gas is emitted into the air through a tail pipe. The catalytic converter purifies the EM contained in the exhaust gas. In addition, a particulate filter for trapping particulate matter (PM) in the exhaust gas is mounted in the exhaust pipe.

A three-way catalyst (TWC) is one type of the catalytic converter and reacts with hydrocarbon (HC) compounds, carbon monoxide (CO) and nitrogen oxides (NOx), which are harmful components of the exhaust gas, to remove these compounds. The TWCs are mainly installed in gasoline vehicles, and Pt/Rh, Pd/Rh or Pt/Pd/Rh systems are used as the TWCs.

A lean-burn engine among gasoline engines may improve fuel efficiency by burning a lean air/fuel mixture. The lean-burn engine burns the lean air/fuel mixture, so air/fuel ratio of the exhaust gas is also lean. However, when the air/fuel ratio is lean, the TWC slips the NOx without reducing all of the NOx contained in the exhaust gas. Accordingly, a vehicle equipped with the lean-burn engine may include a selective catalytic reduction (SCR) catalyst for purifying the NOx slipped from the TWC. The SCR catalyst used in the vehicle equipped with the lean-burn engine may be a passive type SCR catalyst.

When the air/fuel ratio is rich, the TWC reduces the NOx to produce NH3 and the NH3 generated in the TWC is stored in the passive type SCR catalyst. When the air/fuel ratio is lean, the passive type SCR catalyst purifies the NOx contained in the exhaust gas using the stored $NH_3$.

The lean-burn engine, which includes the TWC and the passive type SCR catalyst, may control the air/fuel ratio to be rich by increasing the fuel amount during a predetermined period to store sufficient NH3 in the passive type SCR catalyst. If the amount of the NOx discharged from the lean-burn engine increases, the number and duration where the lean-burn engine operates at the richer air/fuel ratio also increase. Therefore, fuel economy may be deteriorated.

The above information disclosed in this Background section is only for enhancement of understanding of the background of the disclosure and therefore it may contain information that does not form the prior art that is already known to a person of ordinary skill in the art.

SUMMARY

The present disclosure provides an ammonia production catalyst (APC) having advantages of generating $NH_3$ at a rich air/fuel ratio.

Another aspect of the present disclosure provides an after treatment system having further advantages of increasing $NH_3$ supplied into a selective catalytic reduction (SCR) catalyst at the rich air/fuel ratio by disposing the APC between a three-way catalyst (TWC) and the SCR catalyst.

An ammonia production catalyst (APC) according to an form of the present disclosure may include 0.4-0.9 wt % of Pt, 0.057-0.3 wt % of Pd, 0.03-0.1 wt % of Rh, 5.0-15.0 wt % of Ba, 10-30 wt % of $CeO_2$, 48.7-84.513 wt % of a composite of MgO and $Al_2O_3$, and 0-5 wt % of an additive based on a total weight of the APC.

The additive may include at least one of La, Zr, Mg, and Pr.

The composite of MgO and $Al_2O_3$ may include 15-25 wt % of MgO based on a total weight of the composite of MgO and $Al_2O_3$.

A weight ratio of Pt to Pd may be 3:1 to 7:1.

An ammonia production catalyst (APC) according to another form of the present disclosure may include 0.4-0.9 wt % of Pt, 0.057-0.3 wt % of Pd, 0.03-0.1 wt % of Rh, 5.0-15.0 wt % of Ba, 10-25 wt % of $CeO_2$, 48.7-79.513 wt % of a composite of MgO and $Al_2O_3$, and 0-10 wt % of an additive based on a total weight of the APC.

The additive may include at least one of La, Zr, Mg, and Pr.

The composite of MgO and $Al_2O_3$ may include 15-25 wt % of MgO based on a total weight of the composite of MgO and $Al_2O_3$.

A weight ratio of Pt to Pd may be 3:1 to 7:1.

An after treatment system according to an form of the present disclosure may include: an exhaust pipe through which an exhaust gas flows; a three-way catalyst (TWC) mounted on the exhaust pipe and purifying HC, CO, and NOx contained in the exhaust gas; an ammonia production catalyst (APC) mounted on the exhaust pipe at a downstream of the TWC, storing NOx at a lean air/fuel ratio, and generating $H_2$, releasing the stored NOx, and generating $NH_3$ using the released NOx and the generated $H_2$ at a rich air/fuel ratio; and a selective catalytic reduction (SCR) catalyst mounted on the exhaust pipe at a downstream of the APC, storing the $NH_3$ generated in the TWC and the APC, and reducing the NOx contained in the exhaust gas using the stored $NH_3$.

The after treatment system may further include a CO clean-up catalyst (CUC) mounted on the exhaust pipe at a downstream of the SCR catalyst and purifying the CO contained in the exhaust gas.

The after treatment system may further include a particulate filter disposed between the TWC and the APC or between the APC and the SCR catalyst, wherein the particulate filter traps particulate matter in the exhaust gas.

In one aspect, the APC may include Pt, Pd and CeO2, wherein a weight ratio of Pt to Pd is 3:1 to 7:1, and wherein weight ratio of the CeO2 to a total weight of the APC is 10-30 wt %.

In another aspect, the APC may include 0.4-0.9 wt % of Pt, 0.057-0.3 wt % of Pd, 0.03-0.1 wt % of Rh, 5.0-15.0 wt % of Ba, 10-30 wt % of $CeO_2$, 48.7-84.513 wt % of a composite of MgO and $Al_2O_3$, and 0-5 wt % of an additive based on a total weight of the APC.

The additive may include at least one of La, Zr, Mg, and Pr.

The composite of MgO and $Al_2O_3$ may include 15-25 wt % of MgO based on a total weight of the composite of MgO and $Al_2O_3$.

In other aspect, the APC may include Pt, Pd and CeO2, wherein a weight ratio of Pt to Pd is 3:1 to 7:1, and wherein weight ratio of the CeO2 to a total weight of the APC is 10-25 wt %.

In other aspect, the APC may include 0.4-0.9 wt % of Pt, 0.057-0.3 wt % of Pd, 0.03-0.1 wt % of Rh, 5.0-15.0 wt % of Ba, 10-25 wt % of $CeO_2$, 48.7-79.513 wt % of a composite of MgO and $Al_2O_3$, and 0-10 wt % of an additive based on a total weight of the APC.

The additive may include at least one of La, Zr, Mg, and Pr.

The composite of MgO and $Al_2O_3$ may include 15-25 wt % of MgO based on a total weight of the composite of MgO and $Al_2O_3$.

According to forms of the present disclosure, the amount of $NH_3$ supplied to the SCR catalyst at the rich air/fuel ratio can be increased by disposing the APC between the TWC and the SCR catalyst. Thus, the number and the duration where the engine operates at the rich air/fuel ratio may be reduced, thereby improving fuel economy.

CO slipped from the TWC and the APC can be purified by disposing a CO clean-up catalyst at a downstream of the SCR catalyst.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
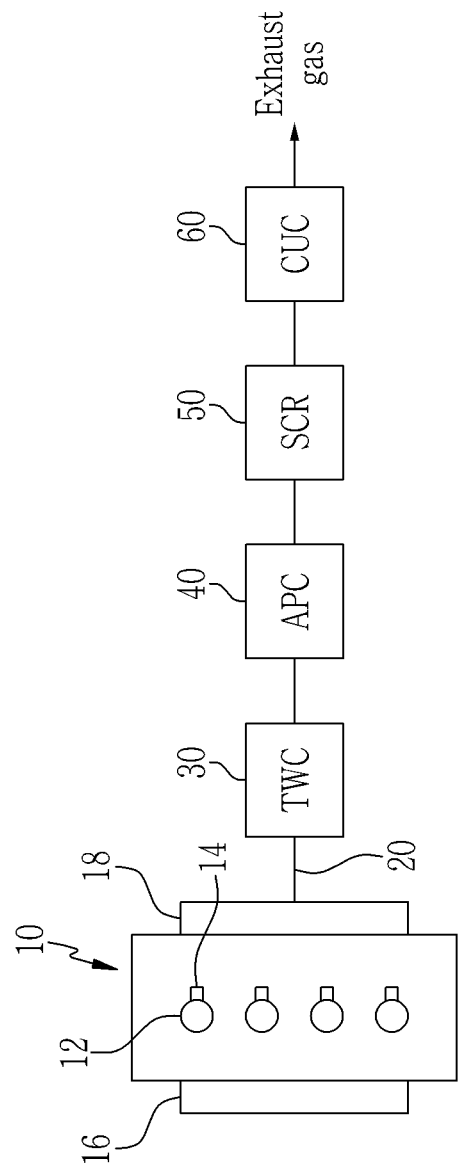
FIG. 1 is a schematic diagram of an after treatment system according to a form of the present disclosure.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The terminology used herein is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the term "vehicle," "vehicular," "car," or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum).

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by a system comprising the controller, as described in detail below.

Furthermore, the controller of the present disclosure may be embodied as non-transitory computer readable media containing executable program instructions executed by a processor or the like. Examples of the computer readable mediums include, but are not limited to, ROM, RAM, compact disc (CD)-ROMs, magnetic tapes, floppy disks, flash drives, smart cards, and optical data storage devices. The computer readable recording medium can also be distributed throughout a computer network so that the program instructions are stored and executed in a distributed fashion, e.g., by a telematics server or a Controller Area Network (CAN).

Hereinafter, forms of the present disclosure will be described in detail with reference to the accompanying drawings.

Figure 2:
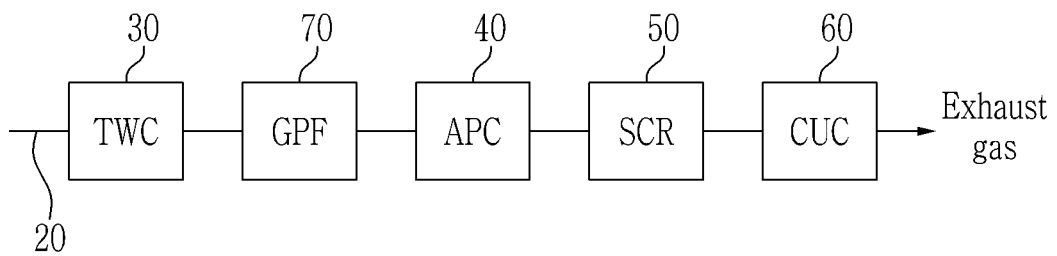
FIG. 2 is a schematic diagram of an after treatment system according to another form of the present disclosure.
Figure 3:
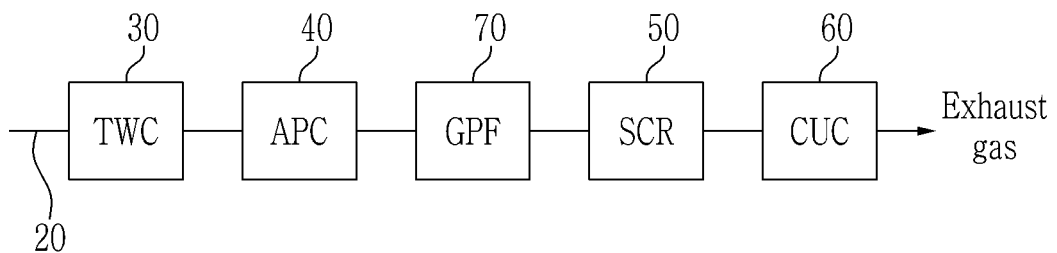
FIG. 3 is a schematic diagram of an after treatment system according to another form of the present disclosure.

FIG. 1 is a schematic diagram of an after treatment system according to a form of the present disclosure; FIG. 2 is a schematic diagram of an after treatment system according to another form of the present disclosure; and FIG. 3 is a schematic diagram of an after treatment system according to other form of the present disclosure.

As shown in FIG. 1, an after treatment system according to a form of the present disclosure includes an engine 10, an exhaust pipe 20, a three-way catalyst (TWC) 30, an ammonia production catalyst (APC) 40, a selective catalytic reduction (SCR) catalyst 50 and a CO clean-up catalyst (CUC) 60. As shown in FIG. 2 and FIG. 3, the after treatment system may further include a particulate filter 70.

The engine 10 burns an air/fuel mixture to convert chemical energy into mechanical energy. The engine 10 is connected to an intake manifold 16 to flow air into a combustion chamber 12. An exhaust gas generated in combustion process is collected in an exhaust manifold 18 and then flows out from the engine 10. The combustion chamber 12 is equipped with a spark plug 14 to ignite the air/fuel mixture within the combustion chamber 12. The engine 10 may be a gasoline engine. Depending on types of gasoline engines, fuel may be directly injected into the combustion chamber 12 or the air/fuel mixture may be supplied to the combustion chamber 12 via the intake manifold 16.

The exhaust pipe 20 is connected to the exhaust manifold 18 to discharge the exhaust gas to an outside of the vehicle. The exhaust pipe 20 is equipped with the TWC 30, the APC 40, the SCR catalyst 50, the CUC 60 and/or the particulate filter 70 to purify or remove emission and particulate matter contained in the exhaust gas.

The TWC 30 is disposed on the exhaust pipe 20 through which the exhaust gas discharged from the engine 10 flows, and harmful materials including CO, HC, and NOx contained in the exhaust gas are converted into harmless components by an oxidation-reaction reaction. In addition, the TWC 30 can reduce the NOx contained in the exhaust gas to $NH_3$ when an air/fuel ratio (AFR) is rich. Since the TWC 30 is well known to a person of an ordinary skill in the art, a detailed description thereof will be omitted.

The APC 40 is disposed on the exhaust pipe 20 at a downstream of the TWC 30. The APC 40 stores the NOx contained in the exhaust gas at a lean AFR, and generates $H_2$ to release the stored NOx and generates $NH_3$ using the released NOx and the generated $H_2$.

In one aspect, the APC 40 includes 0.4-0.9 wt % of Pt, 0.057-0.3 wt % of Pd, 0.03-0.1 wt % of Rh, 5.0-15.0 wt % of Ba, 10-30 wt % of $CeO_2$, 48.7-84.513 wt % of a composite of MgO and $Al_2O_3$, and 0-5 wt % of an additive based on a total weight of the APC 40.

In another aspect, the APC 40 includes 0.4-0.9 wt % of Pt, 0.057-0.3 wt % of Pd, 0.03-0.1 wt % of Rh, 5.0-15.0 wt % of Ba, 10-25 wt % of $CeO_2$, 48.7-79.513 wt % of the composite of MgO and $Al_2O_3$, and 0-10 wt % of the additive based on the total weight of the APC.

The additive is added for the performance improvement of $CeO_2$ and $Al_2O_3$ and includes at least one of La, Zr, Mg and Pr.

The Pt contained in the APC 40 functions to oxidize the NOx for the APC 40 to store the NOx. In addition, the Pt increases an amount of $H_2$ generated in the APC 40.

The Pd contained in the APC 40 improves heat resistance of the APC 40. Since the APC 40 is disposed close to the engine 10, a temperature of the APC 40 can rise to 950° C. Therefore, the Pd is added in the APC 40 to improve heat resistance.

In order to increase the $NH_3$ generation and the $H_2$ generation, a weight ratio of the Pt to the Pd in the APC 40 may be 3:1-7:1. In one aspect, the weight ratio of the Pt to the Pd in the APC 40 may be 3:1-5:1.

The Rh contained in the APC 40 purifies the NOx contained in the exhaust gas at a stoichiometric AFR.

The Ba and the $CeO_2$ contained in the APC 40 is configured to store the NOx in nitrate form.

In addition, the $CeO_2$ increases $H_2$ generation. However, if the APC 40 contains large amounts of the $CeO_2$, the generated $NH_3$ can be reoxidized. Thus, the APC 40 may include 10-30 wt % of $CeO_2$ based on a total weight of the APC 40.

The composite of MgO and $Al_2O_3$ contained in the APC 40 functions as a substrate. The composite of MgO and $Al_2O_3$ may include 15-25 wt % of MgO based on a total weight of the composite of MgO and $Al_2O_3$. The MgO enhances thermal stability of the Ba.

The SCR catalyst 50 is mounted on the exhaust pipe 20 at a downstream of the APC 40. The SCR catalyst 50 stores the $NH_3$ generated in the TWC 30 and the APC 40 at the rich AFR and reduces the NOx contained in the exhaust gas using the stored $NH_3$ at a lean AFR. This type of the SCR catalyst 50 may be referred to as a passive type SCR catalyst 50.

The SCR catalyst 50 may be composed of or include one or a combination of a zeolite catalyst and a metal catalyst supported in a porous $Al_2O_3$. At least one of Cu, Pt, Mn, Fe, Co, Ni, Zn, Cs and Ga may be ion-exchanged in the zeolite catalyst. In the metal catalyst supported in the porous $Al_2O_3$, at least one metal among Pt, Pd, Rh, Ir, Ru, W, Cr, Mn, Fe, Co, Cu, Zn and Ag may be supported in the porous $Al_2O_3$.

The CUC 60 is mounted on the exhaust pipe 20 at a downstream of the SCR catalyst 50. The CUC 60 purifies the CO contained in the exhaust gas. Particularly, the CO may be slipped from the TWC 30 and the APC 40 at the rich AFR. Therefore, emission of the CO to the outside of the vehicle can be prevented or inhibited by disposing the CUC 60 at the most downstream of the after treatment system. The CUC 60 includes Pt, Pd, Rh, and Ba supported in $CeO_2$ and $Al_2O_3$.

In one aspect, the CUC 60 includes 0.2-1.5 wt % of Pt, 0-0.4 wt % of Pd, 0-0.4 wt % of Rh, 0-5.0 wt % of Ba, 40-90 wt % of $CeO_2$, 9.8-59.8 wt % of $Al_2O_3$, and 0-10 wt % of an additive based on a total weight of the CUC 60.

In another aspect, the CUC 60 includes 0.2-1.5 wt % of Pt, 0-0.4 wt % of Pd, 0-0.4 wt % of Rh, 0-5.0 wt % of Ba, 40-90 wt % of $CeO_2$, 9.8-59.8 wt % of $Al_2O_3$, and 0-20 wt % of an additive based on a total weight of the CUC 60.

The additive is added for improving performance of the $CeO_2$ and the $Al_2O_3$ and includes at least one of La, Zr, Mg and Pr.

As shown in FIG. 2 and FIG. 3, the after treatment system may further include the particulate filter (GPF) 70. The particulate filter 70 may be disposed between the TWC 30 and the APC 40 (see FIG. 2) or between the APC 40 and the SCR catalyst 50 (see FIG. 3). The particulate filter 70 traps the particulate matter contained in the exhaust gas and burns the trapped particulate matter.

The exhaust pipe 20 may be equipped with a plurality of sensors for detecting the AFR of the exhaust gas and operation of the catalysts 30, 40, 50 and 60. For example, a plurality of temperature sensors 42 may be mounted at various points of the exhaust pipe 20 to detect the temperature of the exhaust gas at the various points of the exhaust pipe 20. In addition, the exhaust pipe 20 can be equipped with at least one oxygen sensor or lambda sensor at various points to detect the AFR of the exhaust gas. An intake system is equipped with an air flowmeter to detect an amount of an intake air.

The after treatment system may further include a controller. The controller is electrically connected to the sensors to receive the signals corresponding to the detected values by the sensors and determines driving condition of the vehicle, the AFR, and temperatures of the catalysts 30, 40, 50, and 60 based on the signals. The controller may control ignition timing, fuel injection timing, fuel amount, etc. based on the determination results.

EXAMPLES

Hereinafter, performance of the APC 40 will be described through various examples and comparative examples. The compositions of various examples and comparative examples are shown in [Table 1].

TABLE 1

|  | Pt(wt %) | Pd(wt %) | Rh(wt %) | BaO(wt %) | $CeO_2$(wt %) | MgO—$Al_2O_3$ (wt %) | additive (wt %) |
|---|---|---|---|---|---|---|---|
| Comparative Example 1 | | | Applying additional TWC instead of APC | | | | |
| Comparative Example 2 | Pt + Pd = 0.8 (Pt:Pd = 2:1) | | 0.05 | 10 | 20 | 69.15 | 1.4 |
| Example 1 | Pt + Pd = 0.8 (Pt:Pd = 3:1) | | 0.05 | 10 | 20 | 69.15 | 1.4 |
| Example 2 | Pt + Pd = 0.8 (Pt:Pd = 4:1) | | 0.05 | 10 | 20 | 69.15 | 1.4 |
| Example 3 | Pt + Pd = 0.8 (Pt:Pd = 5:1) | | 0.05 | 10 | 20 | 69.15 | 1.4 |
| Example 4 | Pt + Pd = 0.8 (Pt:Pd = 7:1) | | 0.05 | 10 | 20 | 69.15 | 1.4 |
| Comparative Example 3 | Pt + Pd = 0.8 (Pt:Pd = 9:1) | | 0.05 | 10 | 20 | 69.15 | 1.4 |
| Comparative Example 4 | Pt + Pd = 0.8 (Pt:Pd = 4:1) | | 0.05 | 10 | 0 | 89.15 | 1.4 |
| Example 5 | Pt + Pd = 0.8 (Pt:Pd = 4:1) | | 0.05 | 10 | 10 | 79.25 | 1.3 |
| Example 6 | Pt + Pd = 0.8 (Pt:Pd = 4:1) | | 0.05 | 10 | 30 | 59.45 | 1.1 |
| Comparative Example 5 | Pt + Pd = 0.8 (Pt:Pd = 4:1) | | 0.05 | 10 | 40 | 49.55 | 1.0 |
| Comparative Example 6 | Pt + Pd = 0.8 (Pt:Pd = 4:1) | | 0.05 | 10 | 50 | 39.65 | 0.9 |

(Test 1: Performance Comparison Between APC and Additional TWC)

For test 1, the TWC 30, the GPF 70, the SCR catalyst 50 and the CUC 60 are sequentially disposed on the exhaust pipe 20. In Comparative Example 1 the additional TWC is disposed between the GPF 70 and the SCR catalyst 50, and in Example 2 the APC 40 is disposed between the GPF 70 and the SCR catalyst 50. After that, 2.0 L, 4-cylinders, lean-burn gasoline engine is connected to the exhaust pipe 20 and aging treatment is performed. The aging treatment is carried out for 50 hours at 1,000° C. on the TWC 30 basis.

The lean AFR ($\lambda$=1.8) is maintained for 5 minutes at an engine speed of 2,000 rpm to cause the entire after treatment system to be lean atmosphere. Thereafter, an amount of $NH_3$ accumulated at the downstream of the APC 40 and the additional TWC over time, and an amount of CO accumulated at the downstream of the CUC 60 over time are measured while the rich AFR ($\lambda$=0.97) is maintained at the engine speed of 2,000 rpm.

Figure 4:
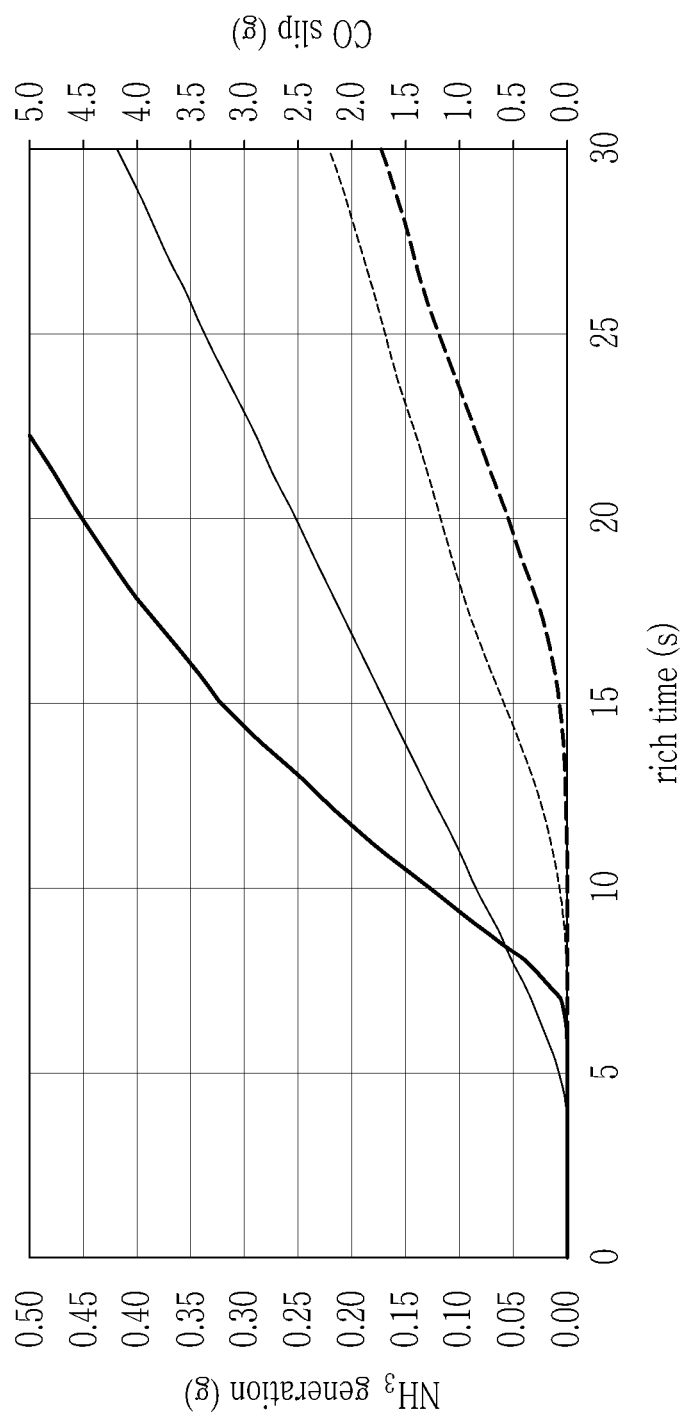
FIG. 4 is a graph showing an amount of $NH_3$ accumulated over time at a downstream of an APC and an additional TWC and an amount of CO accumulated over time at a downstream of a CUC when an air/fuel ratio is rich.

FIG. 4 is a graph showing an amount of $NH_3$ accumulated over time at a downstream of an APC and an additional TWC and an amount of CO accumulated over time at a downstream of a CUC when an air/fuel ratio is rich.

In FIG. 4, a thick solid line represents the amount of $NH_3$ accumulated at the downstream of the APC 40 in Example 2 and a thin solid line represents the amount of $NH_3$ accumulated at the downstream of the additional TWC in Comparative Example 1. Also, a thick dotted line represents the amount of CO accumulated at the downstream of the CUC 60 in Example 2 and a thin dotted line represents the amount of CO accumulated at the downstream of the CUC 60 in Comparative Example 1.

As shown in FIG. 4, since the APC 40 has more oxygen storage material (ie, $CeO_2$) than the additional TWC, a delay time from beginning of the rich AFR to beginning of $NH_3$ generation increases slightly (about 2-3 seconds). However, the APC 40 generates a large amount of $NH_3$ when the AFR is rich, using the stored NOx at the lean AFR. Therefore, the amount of the $NH_3$ accumulated at the downstream of the APC 40 becomes greater than the amount of the $NH_3$ accumulated at the downstream of the additional TWC with the lapse of time. Resultantly, the APC 40 increases the amount of the $NH_3$ generation and supplies more $NH_3$ to the SCR catalyst 50 disposed at the downstream of the APC 40.

Also, a time at which the CO begins to slip from the CUC 60 in a case of Example 2 is slower than the time at which the CO begins to slip from the CUC 60 in a case of Comparative Example 1 (by about 5 seconds).

On the other hand, by modifying Test 1, the lean AFR and the rich AFR are repeated at regular intervals, and amounts of the $H_2$ and the CO are measured at the downstream of the APC 40 and the additional TWC.

Figure 5:
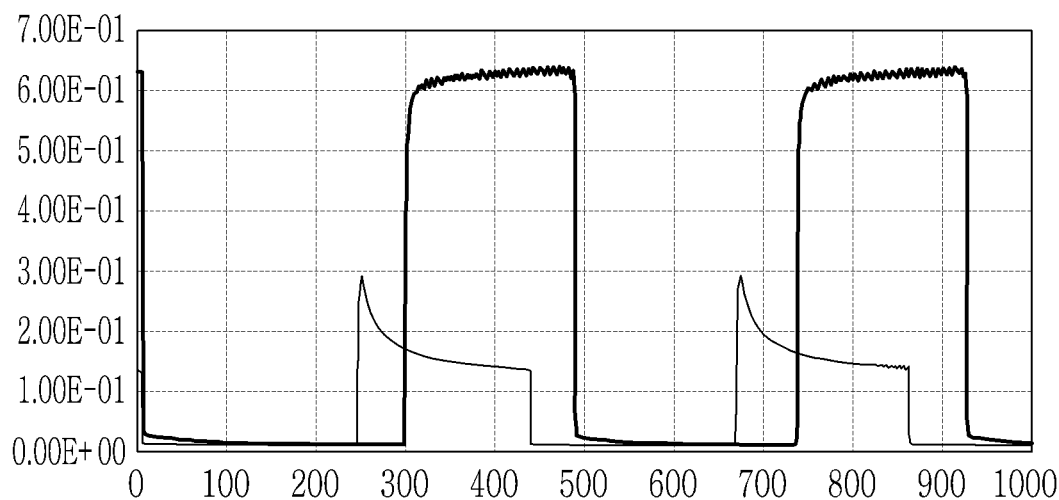
FIG. 5 is a graph showing an amount of $H_2$ at a downstream of an APC and an additional TWC when the air/fuel ratio is rich.
Figure 6:
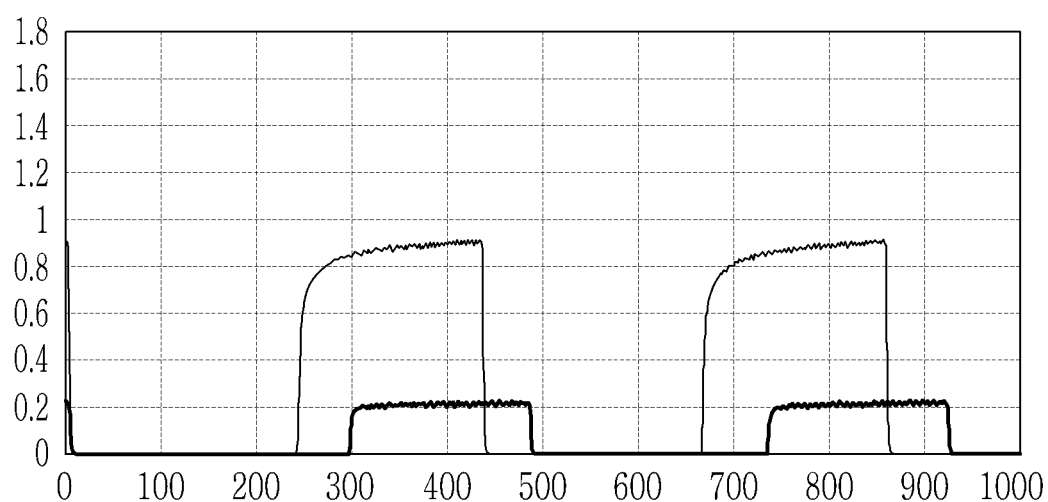
FIG. 6 is a graph showing an amount of CO at a downstream of an APC and an additional TWC when the air/fuel ratio is rich.

FIG. 5 is a graph showing an amount of $H_2$ at a downstream of an APC and an additional TWC when the air/fuel ratio is rich, and FIG. 6 is a graph showing an amount of CO at a downstream of an APC and an additional TWC when the air/fuel ratio is rich.

In FIG. 5, a thick solid line represents the amount of $H_2$ at the downstream of the APC 40 at the rich AFR and a thin solid line represents the amount of $H_2$ at the downstream of the additional TWC at the rich AFR. In FIG. 6, a thick solid line represents the amount of CO at the downstream of the APC 40 at the rich AFR and a thin solid line represents the amount of CO at the downstream of the additional TWC at the rich AFR.

As shown in FIGS. 5 and 6, the amount of $H_2$ at the downstream of the APC 40 is greater than the amount of $H_2$ at the downstream of the additional TWC at the rich AFR, whereas the amount of CO at the downstream of the APC 40 is smaller than the amount of CO at the downstream of the additional TWC. Resultantly, the APC 40, compared to the additional TWC, supplies more $H_2$ to the CUC 60 while supplying less CO to the CUC 60.

(Test 2: Performance Comparison According to Compositions in APC)

For test 2, the TWC 30 and the APC 40 are sequentially disposed on the exhaust pipe 20. After that, 2.0 L, 4-cylinders, lean-burn gasoline engine is connected to the exhaust pipe 20 for aging treatment. The aging treatment is carried out for 50 hours at 1000° C. on the TWC 30 basis and for 50 hours at 930° C. on the APC 40 basis.

The aged TWC 30 and the aged APC 40 are respectively cut to 1-inch diameter and 1-inch length to create a TWC sample and an APC sample, and the TWC sample and the APC sample are connected to a lean-rich gas supply device. The lean-rich gas supply device is a device that supplies gas with a composition similar to the exhaust gas composition of the lean-burn engine.

After the lean AFR ($\lambda$=1.8) is maintained for 5 minutes, the AFR is changed to be rich ($\lambda$=0.97) using the lean-rich gas supply device. The amount of $NH_3$ for 20 seconds at the rich AFR ($\lambda$=0.97) is measured. At this time, the temperature of the TWC 30 is adjusted to 500° C. and the temperature of the APC 40 is adjusted to 450° C.

Figure 7:
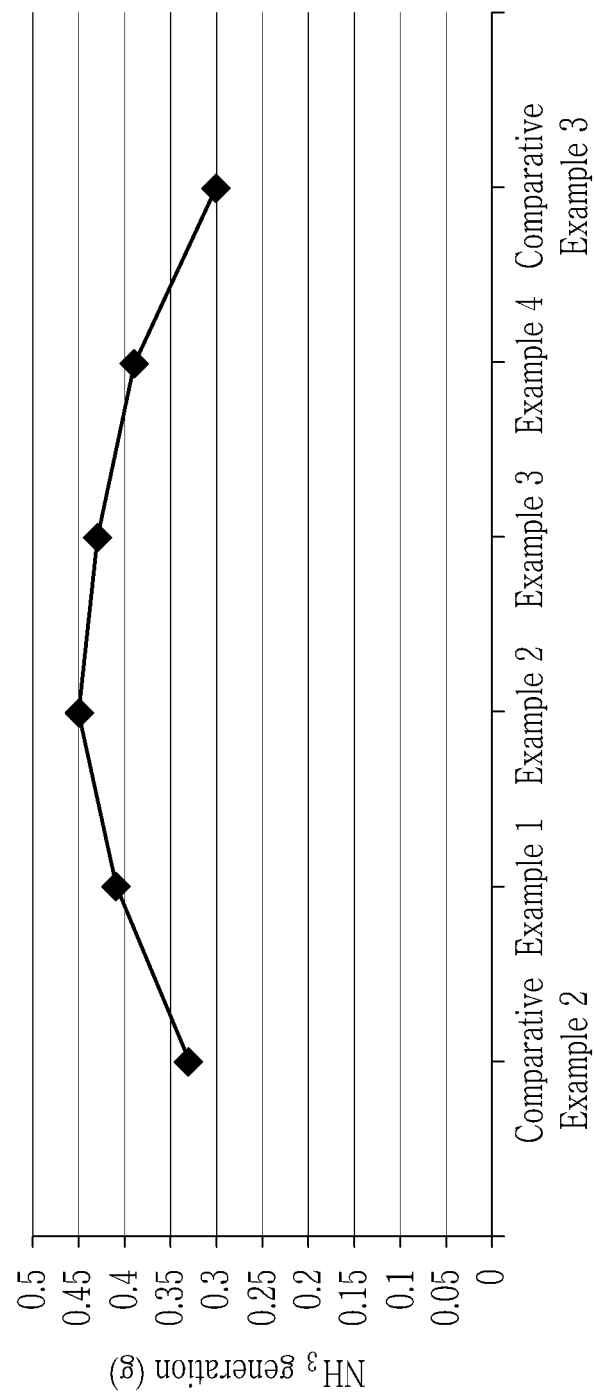
FIG. 7 is a graph showing an amount of $NH_3$ produced according to the weight ratio of Pt to Pd in an APC.

FIG. 7 is a graph showing an amount of $NH_3$ produced according to the weight ratio of Pt to Pd in an APC.

As shown in Table 1, the weight ratios of the Rh, the BaO, the $CeO_2$, the composite of MgO and $Al_2O_3$, and the additive are the same in Comparative Example 2, Example 1, Example 2, Example 3, Example 4 and Comparative Example 3. The total weight ratios of the Pt and the Pd are the same but the weight ratios of the Pt to the Pd are different in Comparative Example 2, Example 1, Example 2, Example 3, Example 4 and Comparative Example 3.

As shown in FIG. 7, the $NH_3$ production in the APC 40 is the greatest in Example 2, and the $NH_3$ production in the APC 40 is appropriate in Example 1 to Example 4. However, the $NH_3$ production in the APC 40 is small in Comparative Example 2 and Comparative Example 3. As described above, to increase $NH_3$ production by increasing $H_2$ production, the content of the Pt may be increased but the Pd may function to improve heat resistance and thermal durability. Particularly, if the APC 40 contains a small amount of the Pd (e.g., in Comparative Example 3), it can be seen that the APC 40 is exposed to high temperature and the ability to generate $NH_3$ is reduced. In contrast, if the APC 40 contains a large amount of the Pd (e.g., in Comparative Example 2), the amount of the Pt contained in the APC 40 is reduced and the $NH_3$ production is also reduced. Therefore, the ratio of the Pt to the Pd in the APC 40 may be 3:1-7:1 in one aspect. In one form, the ratio of the Pt to the Pd in the APC 40 may be 3:1 to 5:1.

Figure 8:
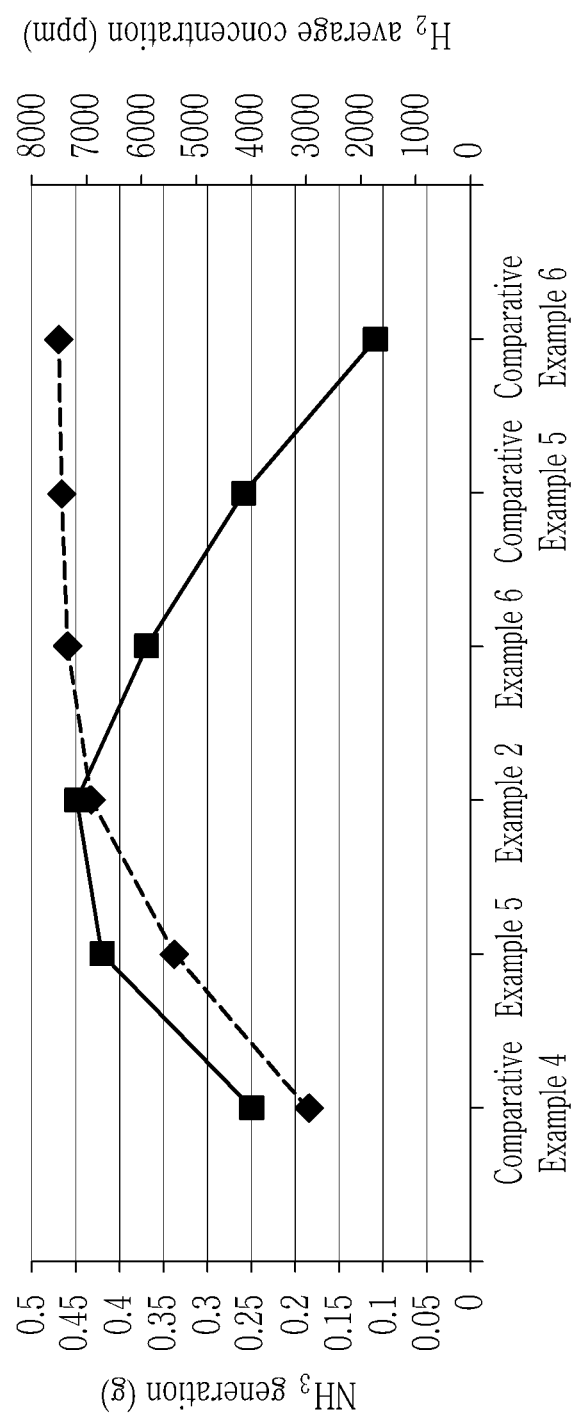
FIG. 8 is a graph showing a cumulative amount of $NH_3$ and an average concentration of $H_2$ according to an amount of $CeO_2$ contained in an APC.

FIG. 8 is a graph showing a cumulative amount of $NH_3$ and an average concentration of $H_2$ according to an amount of $CeO_2$ contained in an APC.

As shown in Table 1, the total weight ratios of the Pt and the Pd, the weight ratios of the Pt to the Pd, and the weight ratios of the BaO are the same in Comparative Example 4, Example 5, Example 2, Example 6, Comparative Example 5. The weight ratios of $CeO_2$ are changed and the weight ratios of the composite of MgO and $Al_2O_3$ are changed accordingly in Comparative Example 4, Example 5, Example 2, Example 6, Comparative Example 5, and Comparative Example 6. The weight ratios of the additive vary in Comparative Example 4, Example 5, Example 2, Example 6, Comparative Example 5, and Comparative Example 6, but do not significantly affect the performance of the APC 40. In addition, the amount of the $CeO_2$ contained in the APC 40 is gradually increased in Comparative Example 4, Example 5, Example 2, Example 6, Comparative Example 5, and Comparative Example 6.

As shown in FIG. 8, the amount of the $NH_3$ produced in the APC 40 is the greatest in Example 2, and the concentration of the $H_2$ produced in the APC 40 is also considerably high. As the amount of the $CeO_2$ increases, the concentration of the $H_2$ also increases in Comparative Example 4, Example 5, Example 2, Example 6, Comparative Example 5, and Comparative Example 6. However, if the amount of the $CeO_2$ exceeds 20 wt % based on the total weight of the APC 40, a ratio of $H_2$ concentration increase to $CeO_2$ increase is slowed down. In addition, if the amount of the $CeO_2$ exceeds 30 wt % based on the total weight of the APC 40 (in Comparative Example 5 and Comparative Example 6), the concentration of the generated $H_2$ is high, but the $NH_3$ generation sharply decreases due to increase of $O_2$ stored in the APC 40. In this case, the produced $NH_3$ is reoxidized by the $O_2$ stored in the APC 40. Therefore, it may be desirable that the amount of $CeO_2$ is 10-30 wt % based on the total weight of the APC 40 in order to improve the $NH_3$ production ability of the APC 40. In one form, the amount of $CeO_2$ to the total weight of the APC 40 may be 10-25 wt %.

It is to be understood that the disclosure is not limited, but, on the contrary, is intended to cover various modifications and equivalent arrangements included within the spirit and scope of the disclosure.

What is claimed is:

1. An after treatment system comprising:
an exhaust pipe through which an exhaust gas flows;
a three-way catalyst (TWC) mounted on the exhaust pipe and purifying HC, CO, and NOx contained in the exhaust gas;
an ammonia production catalyst (APC) mounted on the exhaust pipe at a downstream of the TWC, storing NOR at a lean air/fuel ratio, and generating $H_2$, releasing the stored NOR, and generating $NH_3$ using the released NOR and the generated $H_2$ at a rich air/fuel ratio; and
a selective catalytic reduction (SCR) catalyst mounted on the exhaust pipe at a downstream of the APC, storing the $NH_3$ generated in the TWC and the APC, and reducing the NOR contained in the exhaust gas using the stored $NH_3$, wherein the APC comprises Pt, Pd and $CeO_2$, wherein a weight ratio of Pt to Pd is 3:1 to 7:1, and
wherein the $NH_3$ production in the APC is the greatest when the weight ratio of Pt to Pd is 4:1,
wherein weight ratio of the $CeO_2$ to a total weight of the APC is 10-30 wt %,
wherein a ratio of $H_2$ concentration increase to $CeO_2$ increase slows down if the $CeO_2$ exceeds 20 wt % based on the total weight of the APC, and
wherein the $NH_3$ production decreases due to increase of 02 stored in the APC if the $CeO_2$ exceeds 30 wt % based on the total weight of the APC.

2. The after treatment system of claim 1, further comprising a CO cleanup catalyst (CUC) mounted on the exhaust pipe at a downstream of the SCR catalyst and purifying CO contained in the exhaust gas.

3. The after treatment system of claim 2, further comprising a particulate filter disposed between the TWC and the APC or between the APC and the SCR catalyst,
wherein the particulate filter traps particulate matter in the exhaust gas.

4. The after treatment system of claim 1, wherein the APC comprises 0.4-0.9 wt % of Pt, 0.057-0.3 wt % of Pd, 0.03-0.1 wt % of Rh, 5.0-15.0 wt % of Ba, 10-30 wt % of CeO2, 48.7-84.513 wt % of a composite of MgO and $Al_2O_3$, and 0-5 wt % of an additive based on a total weight of the APC.

5. The after treatment system of claim 4, wherein the additive comprises at least one of La, Zr, Mg, and Pr.

6. The after treatment system of claim 4, the composite of MgO and Al2O3 includes 15-25 wt % of MgO based on a total weight of the composite of MgO and Al2O3.

7. An after treatment system comprising:
- an exhaust pipe through which an exhaust gas flows;
- a three-way catalyst (TWC) mounted on the exhaust pipe and purifying HC, CO, and NOx contained in the exhaust gas;
- an ammonia production catalyst (APC) mounted on the exhaust pipe at a downstream of the TWC, storing NOR at a lean air/fuel ratio, and generating $H_2$, releasing the stored NOR, and generating $NH_3$ using the released NOR and the generated $H_2$ at a rich air/fuel ratio; and
- a selective catalytic reduction (SCR) catalyst mounted on the exhaust pipe at a downstream of the APC, storing the $NH_3$ generated in the TWC and the APC, and reducing the NOR contained in the exhaust gas using the stored $NH_3$, wherein the APC comprises Pt, Pd and $CeO_2$, wherein a weight ratio of Pt to Pd is 3:1 to 7:1, and wherein the $NH_3$ production in the APC is the greatest when the weight ratio of Pt to Pd is 4:1, wherein weight ratio of the $CeO_2$ to a total weight of the APC is 10-25 wt %, wherein a ratio of $H_2$ concentration increase to $CeO_2$ increase slows down if the $CeO_2$ exceeds 20 wt % based on the total weight of the APC, and wherein the $NH_3$ production decreases due to increase of $O_2$ stored in the APC if the $CeO_2$ exceeds 30 wt % based on the total weight of the APC.

8. The after treatment system of claim 7, wherein the APC comprises 0.4-0.9 wt % of Pt, 0.057-0.3 wt % of Pd, 0.03-0.1 wt % of Rh, 5.0-15.0 wt % of Ba, 10-25 wt % of CeO2, 48.7-79.513 wt % of a composite of MgO and Al2O3, and 0-10 wt % of an additive based on a total weight of the APC.

9. The after treatment system of claim 8, wherein the additive comprises at least one of La, Zr, Mg, and Pr.

10. The after treatment system of claim 8, the composite of MgO and Al2O3 includes 15-25 wt % of MgO based on a total weight of the composite of MgO and Al2O3.

11. The after treatment system of claim 7, further comprising a CO cleanup catalyst (CUC) mounted on the exhaust pipe at a downstream of the SCR catalyst and purifying CO contained in the exhaust gas.

12. The after treatment system of claim 11, further comprising a particulate filter disposed between the TWC and the APC or between the APC and the SCR catalyst, wherein the particulate filter traps particulate matter in the exhaust gas.

* * * * *

UNITED STATES PATENT AND TRADEMARK OFFICE
CERTIFICATE OF CORRECTION

PATENT NO. : 10,914,217 B2
APPLICATION NO. : 16/263508
DATED : February 9, 2021
INVENTOR(S) : Nahm Roh Joo et al.

It is certified that error appears in the above-identified patent and that said Letters Patent is hereby corrected as shown below:

On the Title Page

Item (71), Insert additional Applicant --Kia Motors Corporation, Seoul (KR)--

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*